United States Patent

[11] 3,622,912

[72] Inventors Walter M. Doyle
Laguna Beach;
Matthew B. White, Newport Beach, both of Calif.
[21] Appl. No. 826,918
[22] Filed May 22, 1969
[45] Patented Nov. 23, 1971
[73] Assignee Philco-Ford Corporation
Philadelphia, Pa.

[54] INTRA-CAVITY POLARIZATION MODULATED LASER
12 Claims, 3 Drawing Figs.

[52] U.S. Cl. ................................................. 331/94.5
[51] Int. Cl. ................................................. H01s 3/00
[50] Field of Search ................................. 331/94.5;
350/150; 332/7.51; 250/199

[56] References Cited
UNITED STATES PATENTS

| | | | |
|---|---|---|---|
| 3,229,223 | 1/1966 | Miller | 350/150 X |
| 3,237,011 | 2/1966 | Sterzer | 331/94.5 X |
| 3,429,636 | 2/1969 | Wentz | 350/160 |
| 3,471,802 | 10/1969 | Caulfield | 350/150 X |
| 3,508,164 | 4/1970 | Uchida | 331/94.5 |

Primary Examiner—Ronald L. Wibert
Assistant Examiner—T. Major
Attorney—Herbert Epstein ABSTRACT: A laser polarization modulation system including within the laser cavity and in the laser light path a gaseous discharge tube adapted to produce laser oscillations in any one of a number of polarizations, a weakly birefringent element, and a modulator element the birefringence of which is variable, in response to an applied signal, up to a maximum value substantially greater than that of the weakly birefringent element. The modulator element is so oriented with respect to the weakly birefringent element that the modulator element, when supplied with a signal, exhibits an optic axis, oriented plus or minus 45° with respect to the optic axis of the weakly birefringent element, the sign of the angle of orientation depending on the polarity of the applied signal. The amount of birefringence exhibited by the modulator element depends directly on the value of the signal applied thereto. When no signal is applied to the modulator element, it exhibits no birefringence, and the weakly birefringent element is effective to constrain laser oscillations to a single polarization either perpendicular to or parallel to its optic axis. When an applied signal causes the modulator element to exhibit birefringence, that element causes the polarization of the laser oscillations to rotate toward the optic axis of the modulator element by an amount directly dependent on the value of the applied signal. The polarization-modulated output of the laser can be converted into an amplitude modulated signal by passing the laser output through a linear polarizer located externally of the laser cavity. Because only a small change in the birefringence of the modulator element is needed to effect substantially 100 percent amplitude modulation, the frequency of the laser oscillations is not shifted significantly by this change.

PATENTED NOV 23 1971　　　　　　　　　　　　3,622,912

POLARIZATION SHIFT
PRODUCED BY MODULATOR 16

INVENTORS
WALTER M. DOYLE
MATTHEW B. WHITE
BY
Leonard Zalman
ATTORNEY

3,622,912

INTRA-CAVITY POLARIZATION MODULATED LASER

In one prior art laser communication system employing amplitude modulation, a constant-amplitude light beam emergent from the laser cavity is polarized to provide it with a reference polarization and then passed through a signal-controlled polarization modulator which modulates the polarization of the light beam by rotating that polarization by an amount dependent upon the amplitude of the modulating signal. The polarization-modulated light beam emergent from the modulator is impinged on a polarizer which converts it into an amplitude-modulated light beam by transmitting only that beam component having a polarization coincident with that of the polarizer.

This type of system, in which the reference polarizer and the polarization modulator are located outside the resonant cavity of the laser, is disadvantageous because a high-voltage (e.g., 1,000 volt) modulating signal must be supplied to the polarization modulator to achieve substantially 100 percent amplitude modulation.

In another type of laser communication system employing amplitude modulation, the light output of a ruby laser is supplied to a signal-controlled modulator located within the laser cavity. When a signal is supplied to the modulator, a portion of the laser energy is shifted from the polarization established for the system by the ruby to a new polarization determined by the magnitude of such signal. A polarizing prism, positioned between the modulator and the ruby, is used to convert the polarization-modulated light beam into an amplitude-modulated light beam and bring the amplitude-modulated beam out of the resonant cavity.

This system is inefficient because a ruby will support oscillations only in certain fixed polarizations which are determined by its crystal structure. As a result polarization modulation must be achieved principally by operation on the already-generated light beam, without appreciably affecting the polarization of the oscillations within the ruby.

An object of this invention is to provide an improved laser communications system.

Another object is to provide a laser polarization or amplitude modulation system having improved efficiency.

A further object is to provide such a laser system in which the modulator requires only a small driving voltage for near 100 percent amplitude modulation of the beam.

In general these and other objects of the present invention are achieved by a laser amplitude modulation system including two or more reflectors which establish a closed optical path therebetween, a discharge tube disposed in said path and adapted to produce laser oscillations in any one of a number of polarizations, birefringent means located within the laser cavity and responsive to an applied signal to vary the direction of the optic axis thereof, and a polarizer located externally of said laser cavity and in the path of light emitted thereby, for converting the polarization-modulated light beam exiting said laser cavity into an amplitude-modulated light beam. (As in well known, (1) an ellipsoid known as the indicatrix characterizes for any given birefringent means the relationship between the different direction-dependent refractive indices of that means, and (2) for any given direction of light propagation within the birefringent means, that given direction passing through the origin of the principal axes of the indicatrix, the central section of the indicatrix, taken perpendicular to the given direction of propagation, is an ellipse. As used herein, the term "optic axis" designates a direction, within the birefringent means, lying along one of the two principal axes of the elliptical central section of the indicatrix.) In a preferred embodiment of the present invention said birefringent means comprises a weakly birefringent element and a modulator element the birefringence of which is variable, in response to an applied signal, up to a maximum value substantially greater than that of the weakly birefringent element. With this system a low voltage (e.g., 40 volt) modulating signal can achieve substantially 100 percent amplitude modulation.

For a better understanding of the present invention together with other and further objects thereof reference should now be had to the following detailed description which is to be read in conjunction with the accompanying drawing in which.

Figure 1:
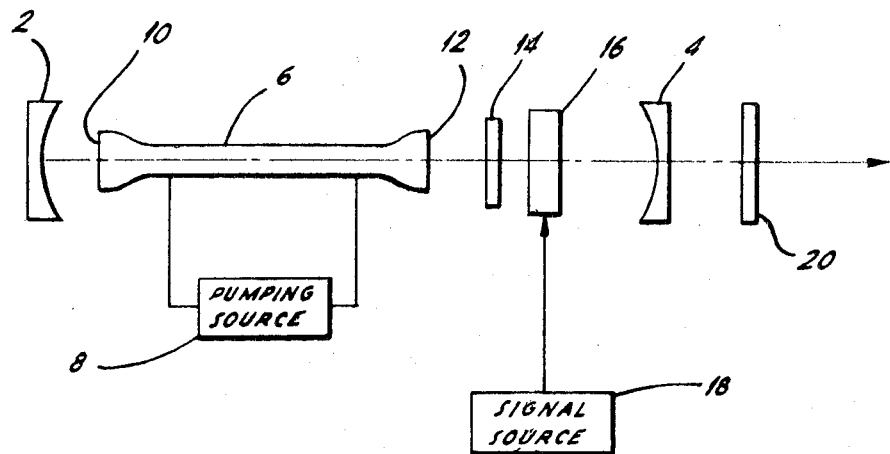
FIG. 1 is a schematic diagram of a preferred embodiment of the laser system of the present invention.

In FIG. 1, two spherical reflectors 2 and 4 define the ends of an optical path extending therebetween. Reflector 2 is wholly reflective and reflector 4 is slightly transmissive, for example, 5 percent transmissive, so that some of the light energy produced by the laser exits the optical path through this reflector. A laser plasma tube 6 is disposed in the path established by reflectors 2 and 4. The active medium of tube 6 may be any gaseous substance which has at least two molecular states, or energy levels, and has the property of being excited into an inverted population density condition, that is, the property that an excess population of molecules can be established in an upper energy level. An active medium having such properties will emit, after appropriate excitation, substantially coherent radiation as the molecules thereof return from the upper energy level to a lower energy level. An example of an active medium appropriate for use in the laser system of the present invention is carbon dioxide.

A conventional pumping source 8 is coupled to tube 6 in a conventional manner. Source 8 may be any source of energy which is capable of exciting the molecules of the active medium from the lower energy level thereof to the desired upper energy level, e.g., means for providing a radiofrequency field or a xenon flash lamp.

Windows 10 and 12 of the tube 6 usually are oriented normal to the optical path defined by reflectors 2 and 4. However, windows 10 and 12 can be oriented at a slight angle to the normal, i.e., displaced from the normal by a few degrees, e.g., 2°, in order to minimize resonance between the two windows 10 and 12 as a result of partial reflections therefrom. Windows 10 and 12 can be made of any isotropic substance, for example, fused silica, and can be antireflection coated to reduce optical losses within the laser cavity. Because windows 10 and 12 are oriented normal or nearly normal to the optical path defined by reflectors 2 and 4, and because these windows are made of an isotropic substance, the light emitted by tube 6 is not constrained to any fixed direction of polarization.

A weakly birefringent element 14 having a fixed optic axis and a modulator element 16 are disposed in the optical path defined by reflectors 2 and 4. The birefringence of modulator element 16 is variable in response to a signal from source 18, up to a maximum value substantially greater than that of the weakly birefringent element 14. Modulator element 16 is so oriented with respect to the weakly birefringent element 14 that, when supplied with a signal from source 18, it exhibits an optic axis oriented at an acute angle with respect to the optic axis of weakly birefringent element 14. The orientation of this optic axis is dependent upon the polarity of the signal from source 18, shifting 90° upon reversal of such polarity. Preferably modulator element 16 is so oriented that its optic axis lies plus or minus 45° with respect to the optic axis of weakly birefringent element 14.

The birefringence of an element, which can be expressed as a multiple or fraction of one wavelength of the light incident on the element, is a measure of the difference in phase retardation between the ordinary and extraordinary rays of light passed through the element. The difference in phase retardation is a direct function of the magnitude of the birefringence.

Both element 14 and modulator element 16 (when energized) introduce birefringence into the laser cavity. The respective birefringences of the two elements so coact that, taken together, the two elements exhibit a resultant optic axis oriented between the respective optic axes of the two birefringent elements and most nearly aligned with the optic axis of that one of the two elements exhibiting the stronger birefringence. Thus, as the birefringence of modulator element 16 is increased from zero to a value much higher than that of element 14, e.g., 10 times as high, the orientation of the resultant optic axis exhibited by elements 14 and 16 in combination rotates continuously from a direction parallel to that of the optic axis of element 14 to a direction parallel to that of the optic axis of element 16.

Element 14 can be any conventional weakly birefringent element, such as, for example, a 3 millimeter thick sheet of optical quality germanium having parallel opposing surfaces. If desired the birefringence introduced into the laser cavity by element 14 can be provided by forming one of the windows 10 and 12 with a low residual stress or by mechanically stressing one of those windows.

Modulator 16 is an electro-optical modulator, for example, a Kerr cell or a Pockels cell, which introduces birefringence into the laser cavity in response to an electrical signal supplied thereto. Alternatively, modulator 16 may be a device which produces birefringence in response to a magnetic field or the application thereto of a mechanical force.

As previously stated, reflector 4 is slightly transmissive, so that some of the light energy produced by the laser exits the laser cavity through this reflector. Positioned in the path of this energy is a polarizer 20 which transmits substantially completely light energy incident thereon of one polarization and attenuates in a varying degree light energy incident thereon of other polarizations. Analyzer 20 can be a ¼ inch thick sheet of optical quality germanium having parallel opposing surfaces oriented with respect to the incident beam at the Brewster angle.

Upon being energized by source 8, laser plasma tube 6 emits coherent light. Due to the orientation of windows 10 and 12, i.e. perpendicular or nearly perpendicular to the axis of the optical path defined by reflectors 2 and 4, the laser cavity, in the absence of element 14 and modulator element 16, emits light that is not constrained to oscillate in any particular plane of polarization. With the weakly birefringent element 14 in the laser cavity and modulator 16 not energized, laser oscillations are constrained to a single polarization oriented either along or perpendicular to the optic axis of element 14. The favored polarization is determined by slight amplitude anisotropies in the laser cavity. These anisotropies plus nonlinear hysteresis in the laser active medium prevent the polarization orientation established by element 14 from suddenly switching through 90° when modulator 16 is energized.

When modulator 16 is energized, a second element exhibiting birefringence becomes operative within the laser cavity. As discussed hereinbefore, the birefringence exhibited by both elements 14 and 16 appears to the coherent light energy as a single birefringence whose resultant optic axis is determined by the relative strengths of the birefringence of element 14 and the birefringence of modulator 16 and the respective orientations of their optic axes. As the birefringence of modulator 16 is increased as a result of an increase in the signal supplied thereto from source 18, the resultant optic axis rotates toward the direction of the optic axis of modulator 16 which, as previously stated, depends upon the polarity of the signal from source 18. Since the single mode of polarization of the laser oscillations is determined by the direction of the resultant optic axis of element 14 and modulator element 16, a rotation of the direction of the resultant optic axis results in polarization rotation of the laser oscillations. Since, in the absence of birefringent elements 14 and 16, tube 6 is adapted to produce oscillations in numerous polarizations, the single mode of polarization to which those elements constrain its oscillations may be established by use of relatively weak birefringent elements which do not shift appreciably the frequency of the laser oscillations. Since only small variations in the birefringence of element 16 are required to rotate the plane of polarization of the laser light through plus or minus 45°, modulating signals having maximum amplitudes much smaller (e.g. 10 to 20 times smaller) than those required by prior art systems may be employed.

Figure 2:
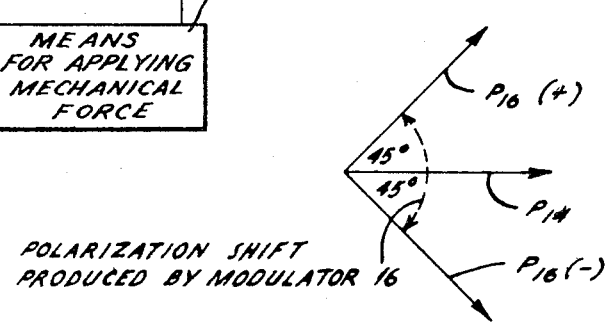
FIG. 2 is a vector diagram illustrating polarization modulation of the oscillations of the laser of FIG. 1.

This polarization rotation is illustrated in FIG. 2. For the purposes of discussion of FIG. 2, it is assumed that the optic axis of element 14 is horizontal and that modulator 16 exhibits an optic axis oriented either plus or minus 45° to the optic axis of element 14. In FIG. 2, P14 represents the direction of polarization to which laser oscillations are constrained by element 14 (when modulator 16 is unenergized), and P16 (+) and P16 (−) represent respectively the maximum angle (45°) through which such constrained oscillations are rotated by signals form source 18 of a first polarity and a second polarity.

Referring again to FIG. 1, the polarization modulated light beam produced within the laser cavity is converted into am amplitude modulated light beam by polarizer 20 located externally of the laser cavity. Since polarizer 20 transmits substantially completely light polarized in a direction parallel to its transmission direction and attenuates substantially completely light polarized in a direction perpendicular to that direction, and signals of appropriate magnitude and polarity will rotate the resultant optic axis of element 14 and modulator element 16 through 90° when the optic axis of element 14 intersects each signal-induced optic axis of modulator 16 at an angle of 45°, it is possible to achieve nearly 100 percent amplitude modulation with the system of the present invention when the transmission direction of polarizer 20 is parallel to one of the signal-induced optic axes of modulator 16.

Because modulator 16 of the system of FIG. 1 is within the laser cavity and is traversed many times by the light energy of that cavity, nearly 100 percent amplitude modulation at relatively low-signal voltages is achievable by that system. For example, when the active medium of the tube 6 is carbon dioxide, the distance between reflectors 2 and 4 is one meter, the laser is operating at the 10.6 micron carbon dioxide transition, windows 10 and 12 have no residual stress birefringence, and element 14 is a 3 millimeter thick sheet of optical quality germanium which produces a birefringence, i.e. a difference in phase retardation between the ordinary and extraordinary rays, of about $\lambda/10^5$ (where $\lambda$ is one wavelength of the laser oscillations), an electro-optic modulator which produces a birefringence of about $\lambda/10^4$ is adequate to produce approximately 100 percent amplitude modulation. Application of a peak-to-peak voltage of about 40 volts between opposing faces of one centimeter cube of gallium arsenide produces a birefringence of about $\lambda/10^4$ meters. For this amplitude modulation process, the peak modulation rate is limited only by the cavity resonance width so that modulation rates up to 20 MHz/sec. are achievable with the laser of FIG. 1. A ruby laser cannot produce the polarization rotation required to achieve 100 percent amplitude modulation because a ruby will support oscillations having only a few fixed polarizations whereas a gas laser having substantially parallel end windows will support oscillations in many different polarizations.

Where audiofrequency modulation rates are adequate, the electro-optical modulator 16 can be replaced by an optical flat that is positioned to rotate about an axis parallel to the polarization direction established by element 14. When the flat is rotated from a position normal to the laser beam propagation direction, Fresnel reflection losses will causes the direction of the output polarization to oscillate between its initial direction and a direction perpendicular to that direction.

Although the description has made specific reference to carbon dioxide as the active medium of tube 6, other gases and mixtures of gases, for example, a mixture of helium and neon, can be used as the active medium of tube 6.

Although two birefringent elements 14 and 16, are employed in the embodiment of FIG. 1, a single element providing both a fixed birefringence and optic axis, and a variable birefringence and a different optic axis, may be substituted therefor. Such an element may comprise, for example, a cube of gallium arsenide stressed to provide fixed birefringence characterized by a first, fixed optic axis, and having also electrodes applied to opposite faces thereof, between which electrodes a voltage may be applied to induce a second birefringence characterized by a second optic axis different from the first axis. The fixed, stress birefringence is of sufficient value to constrain the laser oscillations in tube 6 to a single polarization mode.

Figure 3:
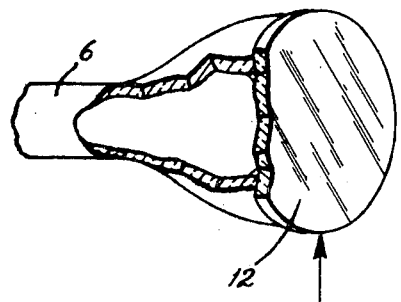
FIG. 3 is a diagram of a portion of the structure comprised in another embodiment of the invention.

As aforementioned, the weak birefringence introduced into the laser cavity, in the embodiment of FIG. 1, by element 14 can alternatively be introduced by mechanically stressing one of the windows 10 and 12. FIG. 3 illustrates diagrammatically one such arrangement, in which a means 22 for applying mechanical force to one of the windows, in this instance window 12, provided to produce the desired stress.

Although in the embodiment of FIG. 1, polarization-varying laser light is obtained outside the laser cavity bounded by reflectors 2 and 4 by employing as reflector 4 a partially transmissive mirror, it is apparent that such light can be obtained outside the cavity by other means. For example, one such means is a partially reflective, partially transmissive plane mirror interposed in the optical path of the cavity, and tilted so as to reflect the remainder of that light out of the cavity. When such a mirror is employed, reflector 4 may be constructed to be wholly reflective of the laser light.

In addition, although the embodiment of FIG. 1 employs a resonant cavity bounded by two reflectors, 2 and 4, the closed optical path can be established by use of more than two reflectors. In such an arrangement the laser discharge tube 6 would be positioned between a pair of those reflectors with its longitudinal axis substantially coincident with the optical path.

We claim:
1. A laser system comprising:
a plurality of reflecting means, positioned to define a closed optical path;
means including an active medium, positioned between a pair of said reflecting means and having a longitudinal axis substantially coincident with said optical path, for producing, when pumped, coherent light having
(i) any one of a plurality of linear polarizations, when no birefringent material intercepts said optical path, and
(ii) a single linear polarization, when a birefringent material having its optic axis perpendicular to said optical path intercepts said path, the direction of said single linear polarization being dependent on the direction of said optic axis of said birefringent material;
means for pumping said active medium;
signal-responsive birefringent means
(i) disposed in said optical path,
(ii) having in the absence of an applied signal a weak birefringence and an optic axis oriented in a first fixed direction substantially perpendicular to said optical path,
(iii) responsive to an applied signal to produce an effective optic axis oriented substantially perpendicular to said optical path in a direction displaced from said first fixed direction by an amount dependent on the value of said applied signal, and
(iv) transmissive in both directions, along the portion of said optical path intercepted by said birefringent means, of radiation polarized in any direction;
the combination of said reflecting means, said means including said active medium, said pumping means and said birefringent means forming an oscillatory system having maximum gain for coherent radiation plane-polarized in one particular direction dependent on said direction of said effective optic axis, whereby said active medium, when pumped, radiates, and said oscillatory system selectively generates, coherent radiation polarized in said one particular direction; and
means for obtaining outside said closed optical path a portion of said coherent radiation generated within said closed path.

2. A laser system according to claim 1, wherein said birefringent means is responsive to the polarity of said applied signal to rotate said effective optic axis
(i) in a given direction when said applied signal has a given polarity, and
(ii) in a direction opposite said given direction when said applied signal has a polarity opposite said given polarity.

3. A laser system according to claim 1, said system additionally comprising means, located outside said closed optical path and positioned to intercept at least part of said obtained coherent radiation, for converting polarization-varying radiation into amplitude-varying radiation.

4. A laser system according to claim 1, wherein said active medium is carbon dioxide.

5. A system according to claim 1 wherein said laser system additionally comprises means for enclosing said active medium, said enclosing means comprising window means intersecting said optical path and substantially equally transmissive along said optical path, to and from said active medium, of light of every polarization, and wherein said birefringent means comprises a weakly birefringent element having a fixed optic axis oriented in said first fixed direction, and a modulator element the birefringence of which is variable, in response to an applied signal, up to a maximum value substantially greater than said weakly birefringent element, said modulator element being so oriented with respect to said weakly birefringent element that said modulator element, when supplied with a signal, exhibits an optic axis oriented in a given direction which is substantially perpendicular to said optical path and is at an acute angle to said optic axis of said weakly birefringent element.

6. A system according to claim 5 wherein said optic axis of said modulator element is oriented about plus or minus 45° with respect to said optic axis of said weakly birefringent element, the sign of the angle of orientation depending on the polarity of said applied signal.

7. A system according to claim 6 wherein the maximum birefringence of said modulator element is about 10 times greater than said birefringence of said weakly birefringent element.

8. A system according to claim 6 wherein said weakly birefringent element is a sheet of optical quality semiconductor material and said modulator is a Pockels cell.

9. A system according to claim 8 wherein said window means comprises windows made of an isotropic material and positioned approximately at right angles to said optical path.

10. A system according to claim 1 wherein said laser system additionally comprises means for enclosing said active medium, said enclosing means having windows intersecting said optical path and oriented approximately at right angles to said optical path, one of said windows having stress birefringence, and said birefringent means includes (i) said one window having stress birefringence and (ii) a modulator the birefringence of which is variable, in response to an applied signal, up to a maximum value substantially greater than that of said stress birefringence of said one window.

11. A system according to claim 1 wherein said active medium is enclosed in a discharge tube having windows approximately at right angles to said path and said birefringent means includes (i) means for applying a mechanical force to one of said windows to provide within said path a first birefringence and (ii) a modulator the birefringence of which is variable, in response to an applied signal, to a maximum value substantially greater than that of said first birefringence.

12. A laser system according to claim 1, wherein said means for obtaining a portion of said coherent radiation outside said closed path is comprised in one of said reflecting means, said one reflecting means being partially transmissive of said coherent radiation.

* * * * *